(12) United States Patent
Perez et al.

(10) Patent No.: US 10,998,121 B2
(45) Date of Patent: May 4, 2021

(54) CAPACITIVELY BALANCED INDUCTIVE CHARGING COIL

(71) Applicant: Apple Inc., Cupertino, CA (US)

(72) Inventors: Yehonatan Perez, Menlo Park, CA (US); Makiko K. Brzezinski, San Jose, CA (US); Karl Ruben F. Larsson, Los Altos, CA (US); Christopher S. Graham, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 561 days.

(21) Appl. No.: 15/664,154

(22) Filed: Jul. 31, 2017

(65) Prior Publication Data

US 2017/0338029 A1    Nov. 23, 2017

Related U.S. Application Data

(62) Division of application No. 14/840,842, filed on Aug. 31, 2015, now abandoned.
(Continued)

(51) Int. Cl.
*H01F 27/23* (2006.01)
*H01F 27/28* (2006.01)
(Continued)

(52) U.S. Cl.
CPC ......... *H01F 27/2823* (2013.01); *H01F 38/14* (2013.01); *H01F 41/098* (2016.01);
(Continued)

(58) Field of Classification Search
CPC .. H01F 27/2804; H01F 38/14; H01F 27/2823; H02J 50/10; H04B 5/0037
See application file for complete search history.

(56) References Cited

U.S. PATENT DOCUMENTS

| 4,612,467 A | 9/1986 | Clegg |
| 4,870,742 A | 10/1989 | Roloff et al. |

(Continued)

FOREIGN PATENT DOCUMENTS

| CN | 1723513 | 1/2006 |
| CN | 101867203 | 10/2010 |

(Continued)

OTHER PUBLICATIONS

China Patent Application No. 201590000907.6, Utility Model Patentability Evaluation Report Received (UMPER), Dec. 7, 2018, 16 pages.

(Continued)

*Primary Examiner* — Elvin G Enad
*Assistant Examiner* — Malcolm Barnes
(74) *Attorney, Agent, or Firm* — Kilpatrick Townsend & Stockton LLP

(57) ABSTRACT

An inductor coil includes a wire which is wound in alternating layers such that the surface area of the wire in each winding viewed from above or below the coil is substantially equal in each half of the coil defined by a line bisecting the center point in each layer. The layers are also wound in a serpentine fashion to balance the capacitance between layers. The substantially equal surface area of wire in each half of a coil layer and in adjacent coil layers results in a balanced capacitance of the coil which, in turn, results in reduced common mode noise.

16 Claims, 6 Drawing Sheets

Related U.S. Application Data

(60) Provisional application No. 62/044,957, filed on Sep. 2, 2014.

(51) Int. Cl.
*H01F 38/14* (2006.01)
*H02J 7/02* (2016.01)
*H04B 5/00* (2006.01)
*H02J 50/10* (2016.01)
*H01F 41/098* (2016.01)

(52) U.S. Cl.
CPC .............. *H02J 7/025* (2013.01); *H02J 50/10* (2016.02); *H04B 5/0037* (2013.01); *H04B 5/0081* (2013.01); *H04B 5/0031* (2013.01)

(56) References Cited

U.S. PATENT DOCUMENTS

| | | | |
|---|---|---|---|
| 4,992,769 A * | 2/1991 | Oppelt | H01F 27/2804 333/25 |
| 5,198,647 A | 3/1993 | Mizuta | |
| 5,305,961 A * | 4/1994 | Errard | H01F 27/2823 174/DIG. 22 |
| 5,719,483 A | 2/1998 | Abbott et al. | |
| 5,917,386 A * | 6/1999 | Dobrovolny | H01F 17/0006 333/119 |
| 6,975,198 B2 | 12/2005 | Baarman et al. | |
| 7,180,265 B2 | 2/2007 | Naskali et al. | |
| 7,477,128 B2 | 1/2009 | Quilici et al. | |
| 7,705,704 B2 | 4/2010 | Lee et al. | |
| 7,830,116 B2 | 11/2010 | Toya et al. | |
| 7,948,208 B2 | 5/2011 | Partovi et al. | |
| 7,952,322 B2 | 5/2011 | Partovi et al. | |
| 8,169,185 B2 | 5/2012 | Partovi et al. | |
| 8,193,769 B2 | 6/2012 | Azancot et al. | |
| 8,229,356 B2 | 7/2012 | Kawamura | |
| 8,344,841 B2 | 1/2013 | Gertenbach et al. | |
| 8,406,823 B2 | 3/2013 | Kondo et al. | |
| 8,421,574 B2 | 4/2013 | Suzuki et al. | |
| 8,482,160 B2 | 7/2013 | Johnson et al. | |
| 8,587,516 B2 | 11/2013 | Kopychev et al. | |
| 8,629,652 B2 | 1/2014 | Partovi et al. | |
| 8,629,654 B2 | 1/2014 | Partovi et al. | |
| 8,643,461 B2 | 2/2014 | Lim et al. | |
| 8,754,609 B2 | 6/2014 | Tsai et al. | |
| 8,760,255 B2 | 6/2014 | Yang et al. | |
| 8,796,989 B2 | 8/2014 | Park et al. | |
| 8,844,817 B2 | 9/2014 | Glanzer et al. | |
| 8,845,590 B2 | 9/2014 | Ash | |
| 8,890,369 B2 | 11/2014 | Baarman et al. | |
| 8,890,470 B2 | 11/2014 | Partovi | |
| 8,896,264 B2 | 11/2014 | Partovi | |
| 8,901,881 B2 | 12/2014 | Partovi | |
| 8,912,686 B2 | 12/2014 | Stoner et al. | |
| 8,922,065 B2 | 12/2014 | Sun et al. | |
| 8,922,162 B2 | 12/2014 | Park et al. | |
| 8,947,041 B2 | 2/2015 | Cook et al. | |
| 8,947,042 B2 | 2/2015 | Kirby et al. | |
| 8,947,047 B2 | 2/2015 | Partovi et al. | |
| 9,054,417 B2 | 6/2015 | Lin | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,118,193 B2 | 8/2015 | Yeh | |
| 9,124,308 B2 | 9/2015 | Metcalf et al. | |
| 9,130,408 B2 | 9/2015 | Ichikawa | |
| 9,160,204 B2 | 10/2015 | Yeh | |
| 9,178,369 B2 | 11/2015 | Partovi | |
| 9,190,849 B2 | 11/2015 | Won et al. | |
| 9,246,214 B2 | 1/2016 | Pope et al. | |
| 2002/0101322 A1 * | 8/2002 | Liu | H01F 17/0013 336/223 |
| 2003/0071706 A1 | 4/2003 | Christensen et al. | |
| 2003/0222750 A1 * | 12/2003 | Kyriazidou | H01F 21/12 336/200 |
| 2004/0108933 A1 * | 6/2004 | Chen | H01F 17/0013 336/200 |
| 2004/0227608 A1 * | 11/2004 | Nakatani | H01P 5/10 336/173 |
| 2005/0288743 A1 * | 12/2005 | Ahn | A61N 1/08 607/61 |
| 2006/0049481 A1 * | 3/2006 | Tiemeijer | H01F 17/0006 257/531 |
| 2007/0018767 A1 * | 1/2007 | Gabara | H01F 17/0006 336/200 |
| 2007/0247269 A1 * | 10/2007 | Papananos | H01L 23/5227 336/200 |
| 2008/0272875 A1 * | 11/2008 | Huang | H01F 41/041 336/182 |
| 2009/0027152 A1 * | 1/2009 | Gianesello | H01F 17/0013 336/225 |
| 2009/0085706 A1 * | 4/2009 | Baarman | H01F 5/003 336/200 |
| 2009/0167476 A1 * | 7/2009 | Lee | H01F 17/0006 336/200 |
| 2009/0284339 A1 * | 11/2009 | Choi | H01F 17/0013 336/200 |
| 2010/0120244 A1 * | 5/2010 | Lim | H01L 23/5225 438/657 |
| 2010/0244972 A1 * | 9/2010 | Tanabe | H01F 17/0013 331/117 FE |
| 2010/0253153 A1 | 10/2010 | Kondo et al. | |
| 2011/0050164 A1 | 3/2011 | Partovi et al. | |
| 2011/0133878 A1 * | 6/2011 | Chiu | H01L 23/5227 336/200 |
| 2011/0143556 A1 | 6/2011 | Hsu et al. | |
| 2011/0198940 A1 * | 8/2011 | Urano | H01F 38/14 307/104 |
| 2011/0221385 A1 | 9/2011 | Partovi et al. | |
| 2011/0248809 A1 * | 10/2011 | Gertenbach | H01F 27/346 336/173 |
| 2012/0092119 A1 * | 4/2012 | Kireev | H01F 17/0013 336/200 |
| 2012/0098484 A1 | 4/2012 | Cheng et al. | |
| 2013/0026981 A1 | 1/2013 | Van Der Lee et al. | |
| 2013/0063084 A1 * | 3/2013 | Tilvis | H02J 7/0044 320/108 |
| 2013/0069595 A1 | 3/2013 | Rejman et al. | |
| 2013/0093388 A1 | 4/2013 | Partovi | |
| 2013/0099563 A1 | 4/2013 | Partovi et al. | |
| 2013/0107126 A1 | 5/2013 | Nonomura et al. | |
| 2013/0119926 A1 | 5/2013 | Lin et al. | |
| 2013/0127252 A1 | 5/2013 | Yerazunis et al. | |
| 2013/0127406 A1 | 5/2013 | Winger et al. | |
| 2013/0135076 A1 * | 5/2013 | Nagase | H01F 5/003 336/220 |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi et al. | |
| 2013/0285605 A1 | 10/2013 | Partovi et al. | |
| 2013/0300204 A1 | 11/2013 | Partovi et al. | |
| 2014/0021909 A1 | 1/2014 | Klawon et al. | |
| 2014/0049422 A1 * | 2/2014 | Von Novak | H02J 50/12 342/146 |
| 2014/0062212 A1 * | 3/2014 | Sun | H01F 38/14 307/104 |
| 2014/0083997 A1 | 3/2014 | Chen et al. | |
| 2014/0103873 A1 | 4/2014 | Partovi et al. | |
| 2014/0132210 A1 | 5/2014 | Partovi et al. | |
| 2014/0191568 A1 | 7/2014 | Partovi et al. | |
| 2014/0206372 A1 | 7/2014 | Zeng et al. | |
| 2014/0306654 A1 | 10/2014 | Partovi et al. | |
| 2015/0130412 A1 | 5/2015 | Partovi | |
| 2015/0145475 A1 | 5/2015 | Partovi et al. | |
| 2015/0145630 A1 * | 5/2015 | Suzuki | H02J 50/10 336/200 |
| 2015/0170827 A1 * | 6/2015 | Tsukahara | H01F 17/0013 361/781 |

(56) References Cited

U.S. PATENT DOCUMENTS

| | | | |
|---|---|---|---|
| 2015/0220109 A1* | 8/2015 | von Badinski | G02B 19/0061 340/539.12 |
| 2015/0287527 A1 | 10/2015 | Kasar | |
| 2015/0302971 A1 | 10/2015 | Wagman et al. | |
| 2015/0311740 A1 | 10/2015 | Hilario et al. | |
| 2015/0333562 A1* | 11/2015 | Nam | H02J 7/0044 320/108 |
| 2015/0364938 A1* | 12/2015 | Lapetina | H01F 27/365 320/114 |
| 2015/0367739 A1* | 12/2015 | Boser | H01F 38/14 320/108 |
| 2016/0012968 A1* | 1/2016 | Chiu | H01F 38/14 320/108 |
| 2016/0064137 A1 | 3/2016 | Perez et al. | |
| 2016/0094076 A1 | 3/2016 | Kasar et al. | |
| 2016/0094078 A1 | 3/2016 | Graham et al. | |
| 2016/0118711 A1 | 4/2016 | Finn et al. | |

FOREIGN PATENT DOCUMENTS

| | | |
|---|---|---|
| CN | 201945750 | 8/2011 |
| CN | 102377250 | 3/2012 |
| CN | 102457090 | 5/2012 |
| CN | 103051067 | 4/2013 |
| CN | 103065773 | 4/2013 |
| CN | 103168405 | 6/2013 |
| CN | 103378639 | 10/2013 |
| EP | 2535906 | 12/2012 |
| EP | 2597747 | 5/2013 |
| EP | 2621050 | 7/2013 |
| EP | 2693591 | 2/2014 |
| FR | 2883428 | 9/2006 |
| JP | 58087804 | 5/1983 |
| JP | 0562010 U * | 8/1993 |
| JP | 05291044 A * | 11/1993 |
| JP | 08079976 | 3/1996 |
| JP | 2008210862 | 9/2008 |
| JP | 3212150 | 8/2017 |
| KR | 1020070044614 | 4/2007 |
| TW | 201251258 | 12/2012 |
| TW | 201421866 | 6/2014 |
| TW | 201619986 | 6/2016 |
| WO | 03105311 | 12/2003 |
| WO | 2013165167 | 11/2013 |

OTHER PUBLICATIONS

PCT/US2015/047971, "International Preliminary Report on Patentability", dated Mar. 16, 2017, 10 pages.

Taiwanese Patent Application No. 104129056, "Office Action", dated Oct. 12, 2017, 7 pages.

KR2020177000020, "Office Action", dated Jan. 16, 2018, 14 pages.

U.S. Appl. No. 14/840,842, "Final Office Action", dated Apr. 6, 2017, 13 pages.

U.S. Appl. No. 14/840,842, "Non Final Office Action", dated Nov. 10, 2016, 14 pages.

PCT/US2015/047971, "International Search Report and Written Opinion", dated Nov. 10, 2015, 13 pages.

TW104129056, "Office Action", dated Jun. 6, 2017, 4 pages.

CN201590000907.6, "Notice of Decision to Grant," dated Jul. 4, 2018, 2 pages.

TW104129056, "Notice of Decision to Grant," dated Apr. 20, 2018, 3 pages.

* cited by examiner

CAPACITIVELY BALANCED INDUCTIVE CHARGING COIL

CROSS-REFERENCES TO RELATED APPLICATIONS

This application is a divisional patent application of and claims the benefit to U.S. patent application Ser. No. 14/840,842, filed Aug. 31, 2015 entitled "Capacitively Balanced Inductive Charging Coil," which is a nonprovisional patent application of and claims the benefit to U.S. Provisional Patent Application No. 62/044,957, Sep. 2, 2014 entitled "Capacitively Balanced Inductive Changing Coil," the disclosure of which is hereby incorporated herein by reference in its entirety.

FIELD

The described embodiments relate generally to inductive energy transfer and, more particularly, to an inductive coil design that may reduce noise in portable electronic devices.

BACKGROUND

Recent advances in portable computing have resulted in increased convenience for users of portable electronic devices. For example, mobile telephone, smart phones, computer tablets, and laptop computers allow a user to communicate while that user is mobile. That is, a user has the ability to travel freely while employing these electronic devices for communication and internet access including for navigational purposes. In addition to portable electronic devices, many other devices use battery power. For example, battery powered automobiles and golf carts are in widespread use. Lawn mowers or other rechargeable devices such as electric toothbrushes utilize rechargeable battery power.

The portable electronic devices referred to above operate on battery power which is what allows them to be mobile. That is, no power cords or other paraphernalia which might interfere with, or restrict, user movement are required. However, battery life may be a significant concern to a user in that it may limit the amount of time available for his or her mobility. Batteries require periodic recharging in order to maintain their power capabilities. Battery recharging requires power cords which may present certain limitations. Thus, the use of electric battery chargers, while suited for their intended purpose, may be limited in their usefulness and convenience.

One alternative battery charging technology that is being adopted is inductive charging using wireless chargers. Wireless transmission uses a magnetic field to transfer electricity allowing compatible devices to receive power through this induced current rather than using conductive wires and cords. Inductive charging is a method by which a magnetic field transfers electricity from an external charger to a mobile device such as a phone or laptop computer eliminating wired connection. Induction chargers typically use an induction coil to create an alternating electromagnetic field and a second induction coil in the portable device takes power from the electromagnetic field and converts it back into electrical current to charge the battery. The two induction coils in proximity combine to form an electrical transformer.

Under some circumstances, inductive charging can result in unwanted electromagnetic effects. A conventional coil winding may create unbalanced capacitance that can cause unwanted common mode noise on ground planes of portable electronic devices. "Common mode noise" is generally a form of coherent interference that affects two or more elements of an electromagnetic device in a highly coupled manner. This unwanted noise is especially troublesome for portable electronic devices that include touch sensors which require low noise on ground planes for optimal operation. The result is that use of touch sensors and screens may be significantly negatively impacted while the portable electronic device is being charged with an inductive charging device. Thus, in some cases the portable electronic device may be effectively inoperable during inductive battery charging.

SUMMARY

Embodiments described herein include improved coil constructions that can reduce unwanted capacitive losses and noise generated in the transmitter and receiver coils. The windings i.e., turns of the coil are oriented such that the surface area of wire on each half of the coil is approximately equal in order that the capacitive effects produced by the coils are balanced and noise is thus substantially reduced. The portable electronic device may be a transmitter device or a receiver device.

One embodiment may take the form of an inductive coil comprising: a length of electrically conductive wire forming at least one winding in a planar layer, the layer including a center point, the at least one winding comprising: a first half of the winding; and a second half of the winding contiguous with the first half; wherein the wire crosses itself at a an edge of the first and second halves.

Another embodiment may take the form of an inductive coil comprising: first and second adjacent coil layers formed from a single wire; wherein the first layer defines a plane bisected by a line through a center point of the plane, the line defining a first half and a second half of the at least one layer; the first layer comprises a plurality of windings made from a continuous length of wire that crosses itself; the wire forms a first winding of the at least one layer before crossing itself; and the wire forms a second winding of the at least one layer after crossing itself.

Still another embodiment may take the form of a portable electronic device comprising:

a housing; one or more electronic components within the housing; and an inductive coil including a length of electrically conductive wire formed into at least one winding in a planar layer, the layer including a center point in the planar layer, each winding including: a first portion comprising approximately one half of the winding as determined by a line through the center point parallel with the planar layer; and a second portion comprising another half of the winding in the planar layer opposite to the first portion; wherein the length of wire comprising the first portion is approximately equal to the length of wire comprising the second portion.

These and other embodiments will be appreciated upon reading the description in its entirety.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. For example, a suitable electronic device may be any portable or semi-portable electronic device that may receive energy inductively ("receiver device"), and a suitable docking device may be any portable or semi-portable docking station or charging device that may transmit energy inductively ("transmitter device").

Embodiments described herein provide an inductive energy transfer system that transfers energy inductively from a transmitter device to a receiver device to charge a battery or to operate the receiver device. Additionally or alternatively, communication or control signals can be transmitted inductively between the transmitter and receiver devices. Thus, the terms energy, power, or signal(s) are meant to encompass transferring energy for wireless charging, transferring energy as communication and/or control signals, or both wireless charging and the transmission of communication and/or control signals.

Figure 1:
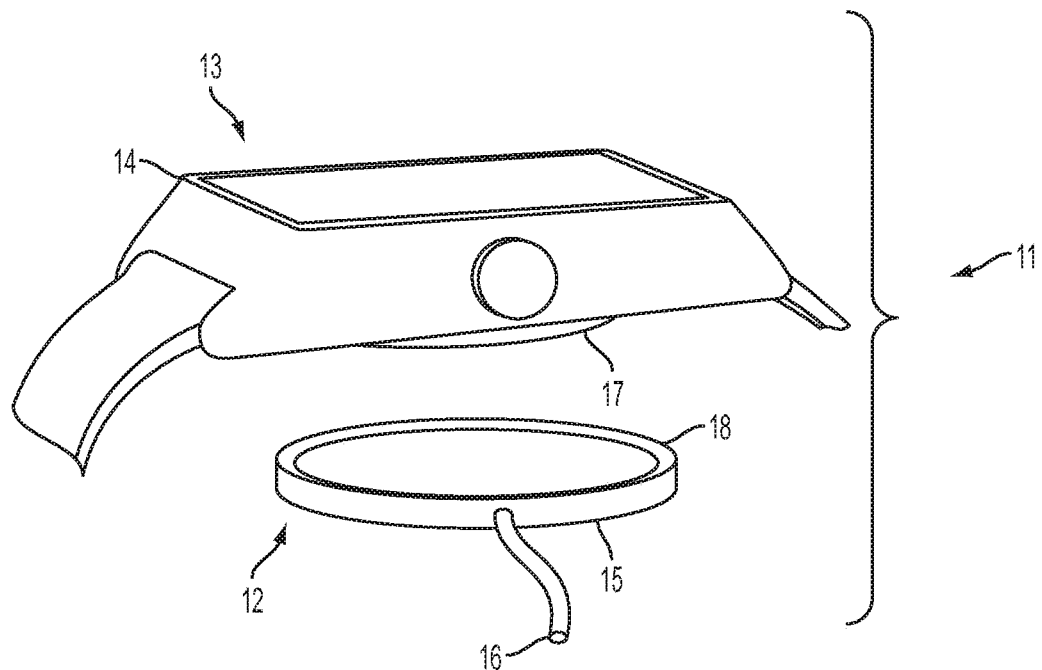
FIG. 1 is a perspective view of a portable electronic device and a separate charging device.
Figure 2:
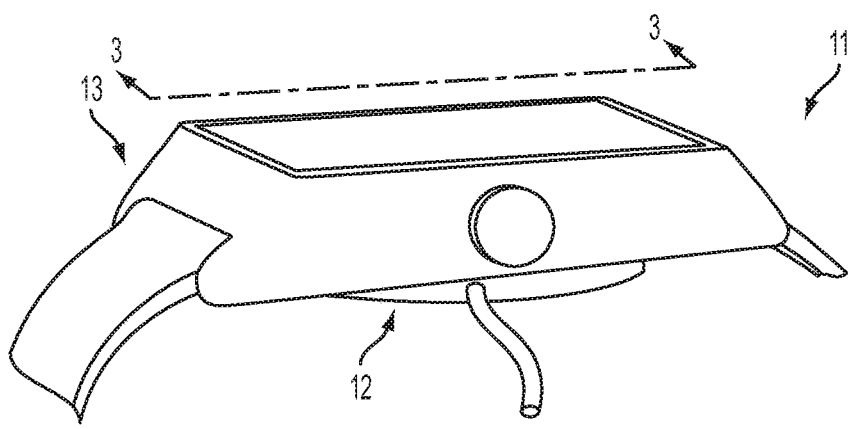
FIG. 2 is a perspective view of a portable electronic device and a charging device shown with the devices inductively coupled.

Referring now to FIG. 1, there is shown a perspective view of one example of an inductive energy transfer system 11 in an unmated configuration. The illustrated embodiment shows a transmitter or charging device 12 that is configured to wirelessly pass energy to a receiver device, which may be a portable electronic device 13. Although system 11, as illustrated in FIGS. 1 and 2, depicts a watch as the portable electronic device, any electronic device may be configured for use with embodiments described herein. Sample electronic devices that may be configured to incorporate inductive charging as described herein include: tablet computing devices; mobile phones; computers; health monitors; wearable computing devices (e.g., glasses, a watch, clothing or the like); and so on.

In many embodiments, a wearable accessory, such as electronic device 13 as depicted in FIG. 1, may include a controller, processor, or other processing unit(s) coupled with or in communication with a memory, one or more communication interfaces, output devices such as displays and speakers, one or more sensors, such as biometric and imaging sensors, and one or more input devices such as buttons, dials, microphones, or touch-based interfaces. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable device may provide information regarding time, health, statuses of externally connected or communicating devices and/or software executing on such devices, messages, video, operating commands, and so forth (and may receive any of the foregoing from an external device), in addition to communications.

As stated above, electronic device 13 may include a controller or other electronic components. The controller may execute instructions and carry out operations associated with portable electronic devices as described herein. Using instructions (which may be retrieved from device memory), a controller may regulate the reception and manipulation of input and output data between components of the electronic device. The controller may be implemented in a computer chip or chips. Various architectures can be used for the controller such as microprocessors, application specific integrated circuits (ASICs) and so forth. The controller, together with an operating system, may execute computer code and manipulate data. The operating system may be a well-known system such as iOS, Windows, UNIX or a special purpose operating system or other systems as are known in the art. The controller may include memory capability to store the operating system and data. The controller may also include application software to implement various functions associated with the portable electronic device.

Electronic device 13 includes a housing 14 to enclose electronic, mechanical and structural components of electronic device 13. Similarly, housing 15 may enclose electronic components of charging device 12. In some embodiments electronic device 13 may have a larger lateral cross section than that of the charging device 12, although such a configuration is not required. In other examples, charging device 12 may have a larger lateral cross section than that of the receiver device. In still further examples, the cross sections of the charging device and the receiving device may be substantially the same. In other embodiments, charging device 12 can be adapted to be inserted into a charging port (not shown) in the receiving device.

In the illustrated embodiment, charging device 12 may be connected to a power source by a cord or connector 16. For example, charging device 12 can receive power from a wall outlet, or from another electronic device through a connector, such as a USB connector. Additionally or alternatively, charging device 12 may be battery operated. Similarly, although the illustrated embodiment is shown with the connector 16 coupled to the housing of charging device 12, connector 16 may be electromagnetically connected by any suitable means. Connector 16 may be removable and may include a connector that is sized to fit within an aperture or receptacle opening within housing 15 of charger device 12.

Electronic device 13 may include a first interface surface 17 that may interface with, align or otherwise contact a second interface surface 18 of charging device 12. While shown as substantially rounded (e.g., convex and concave, respectively), interfaces 17, 18 may be rectangular, triangular, or have any other suitable shape in three dimensions or in cross-section. In some embodiments the shape of the interface surfaces 17,18 may facilitate alignment of the electronic device 13 and charging device 12. For example and as shown, the second interface surface 18 of charging device 12 may be configured to have a particular shape that mates with a complementary shape of electronic device 13 as shown in FIG. 2. In the current example, second interface surface 18 may include a concave shape that follows a selected curve of first interface surface 17. That is, first interface surface 17 of electronic device 13 may include a convex shape following the same or substantially similar curve as the concave shape of the second interface surface 18.

Figure 3:
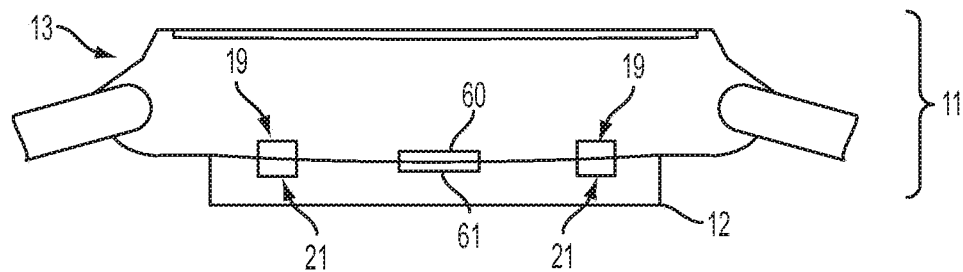
FIG. 3 depicts a cross-sectional view of the portable electronic device taken along line 3-3 in FIG. 2.

Charging device 12 and electronic device 13 can be positioned with respect to each other using one or more alignment mechanisms, as shown in FIG. 3. As one example, one or more magnetic devices 60, 61 may be included in charging device 12 and/or electronic device 13 and used to align the devices. In another embodiment, one or more actuators in the charging device 12 and/or electronic device 13 can be used to move one or both the devices with respect to one another to facilitate alignment. In another embodiment, alignment features, such as protrusions and corresponding indentations in the housings 14, 15 of the charging device 12 and/or electronic device 13, may be used to align the charging device 12 and/or electronic device 13.

FIG. 3 depicts a side cross-sectional view of the inductive energy transfer system taken along line 3-3 in FIG. 2. As discussed earlier, both charging device 12 and electronic device 13 can include electronic, mechanical, and/or structural components. The illustrated embodiment of FIG. 3 omits many electronic, mechanical, and structural components for ease of illustration.

FIG. 3 shows one example inductive energy transfer system in a mated and aligned configuration. Electronic device 13 includes one or more receiver coils 19 having one or more windings. Likewise, charging device 12 includes one or more transmitter coils 21 having one or more windings. Transmitter coil 21 may transmit energy to receiving coil 19 in electronic device 13. Receiver coil 19 may receive energy from the charging device 12 and may use the received energy to perform or coordinate one or more functions of the electronic device 13, and/or to replenish the charge of a battery (not shown) within electronic device 13. The receiver coil 19 and transmitter coil 21 may have any number of rows, columns, windings, and so on.

The transmitter and receiver coils can be implemented with any suitable type of inductor and each coil can have any of a number of shapes and dimensions. As will be further discussed with respect to specific embodiments, transmitter coils 21 and receiver coils 19 can have the same number of windings or a different number of windings. Typically, the transmitter 19 and receiver 21 coils are surrounded by an enclosure to direct the magnetic flux in a desired direction (e.g., toward the other coil). The enclosures are omitted in FIG. 3 for ease of illustration.

Figure 4:
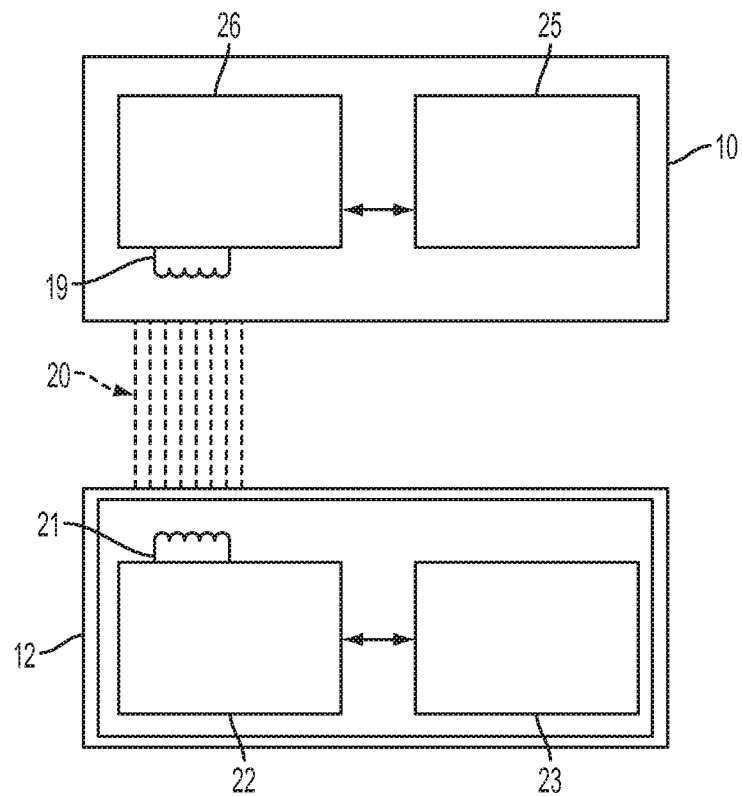
FIG. 4 depicts a simplified block diagram of one example of an inductive charging system.

FIG. 4 is a schematic diagram illustrating one simplified example of an inductive charging system configuration. As shown, a charging device 12 includes power unit and control circuitry 23. Transmitting coil 21 generates a magnetic field 20. A mobile device includes a battery pack 10 which includes a battery 25 and associated control circuitry 26. Receiving coil 19 captures magnetic field 20 from charging device 12. Receiving coil 19 has an electrical current induced therein when receiving coil 19 is positioned adjacent to transmitting coil 21 and battery charging device 12 is energized.

Transmitting coil 21, is energized by applying a current thereto, which creates magnetic flux lines 20 that allow receiving coil 19 to receive voltage when in sufficient proximity to the transmitting coil. Voltage received in receiving coil 19 may induce current therein, which may charge battery 25 after being rectified in control circuitry 26.

As discussed above, charging coil 21 and receiving coil 19 should be in sufficiently close proximity to enable charging coil 21 to induce the electrical current in receiving coil 19 through magnetic flux 20.

Figure 5:
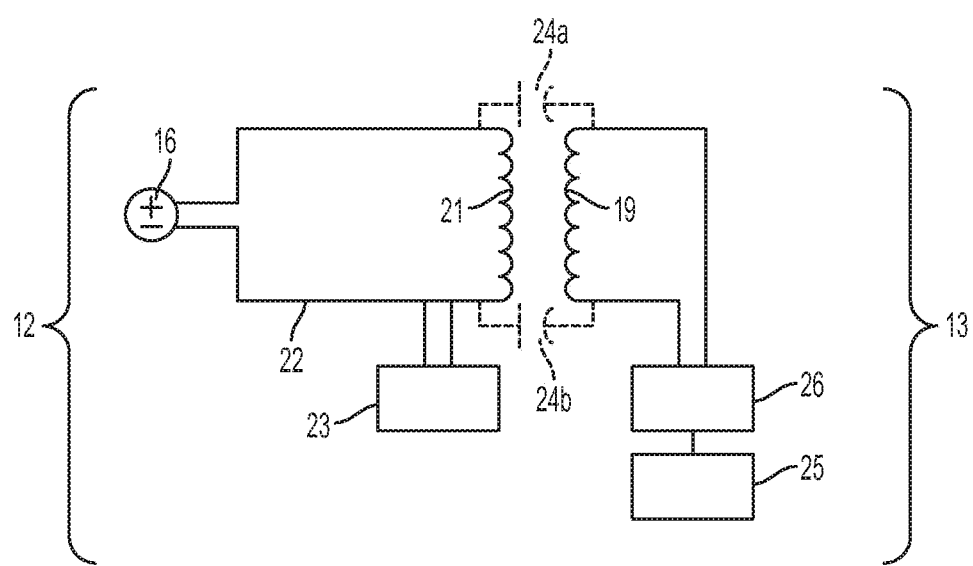
FIG. 5 is a simplified circuit diagram of an inductive charging system.

Referring to FIG. 5, a schematic of the circuitry associated with the inductive charging system is shown. Charging device 12 typically includes power input 16. Charger device 12 typically includes control circuitry 23, which may be a switching power supply to boost voltage and/or frequency of current on the charger coil 21. A/C current conducted through coil 21 may create magnetic flux lines 20 that will allow receiving coil in the vicinity to receive voltage and that voltage may induce current in receiving coil 19. In certain embodiments, receiving coil 19 may be of sufficient size to accept induced voltage from charging coil 21 at a voltage level and frequency sufficient to allow it to charge a battery 25 and still power other functions of the electronic device. The current induced in receiving coil 19 may be rectified by control circuitry 26 prior to be provided to battery 25.

Coil geometry in inductive charging systems can generate parasitic or unwanted capacitance, as represented by capacitors 24a and b. These capacitors are shown in phantom because they do not exist in actuality, but represent a parasitic capacitive effect produced by coils 19 and 21 as will be discussed herein.

Any two adjacent conductors with a resulting potential difference existing between them can be considered a capacitor. Capacitance is inversely proportional to distance such that a greater separation results in less capacitance so that conductors in close proximity generally may have higher capacitance between them. This stray capacitance is typically small unless the conductors are close together, cover a large area, or both. For example, stray capacitance may exist between the parts of an inductor winding simply because of the conductive wires' proximity to each other. When a potential difference exists across the windings of an inductor, the coils may act like the plates of a capacitor and store charge.

In the embodiment shown in FIG. 5, parasitic capacitances may be generated by coils 19 and 21. Further, if the coils are conventionally wound, the parasitic capacitances may be unbalanced. That is, the capacitance represented by capacitor 24a may be larger than the capacitance represented by capacitor 24b. This unbalanced capacitance can generate unwanted noise in the receiving device 13, which may interfere with the operation of various features and functions of portable electronic device 13 such as capacitive touch sensing, biometric sensing, force sensing and other functionalities.

The presence of parasitic capacitance introduces interference (e.g., noise) in portable electronic device 13. That is, the parasitic stray capacitance may cause large voltage swings which interfere with the capacitive sensing functions because these functions use ground reference. The stray capacitance may cause a ground differential between the transceiver 12 and receiver 13 portions of the inductive charging function thereby changing the ground reference for the capacitive sensing function.

Figure 6:
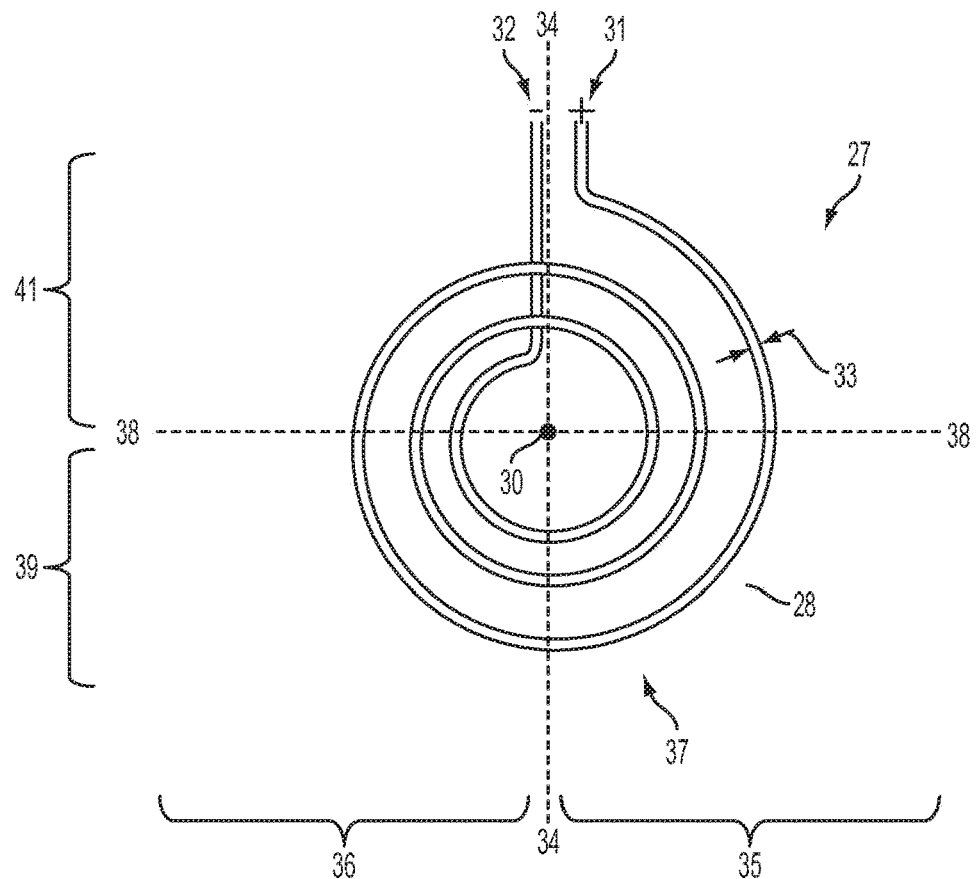
FIG. 6 is a top view of a spirally wound inductive coil.

A top view of a conventional wire winding coil 27 for an inductive charging device is shown in FIG. 6, although the distance between windings of the coil is increased to simplify viewing and comprehension of the figure. A single length of wire 28 is spirally wound in conventional inductive coil 27 such that the radius of each winding of wire 28 increases from center point 30. In FIG. 6, lines 34-34 and 35-35 extend though center point 30 of coil 27, which generally lies in a plane. A winding is defined as one revolution of wire 28, beginning and ending at the intersection of a bisecting radius extending from a center point of coil 27, such as one half of line 34-34 of any other line passing through the center of the coil. For example, wire 28 intersects line 34 at a given point on the line. A single coil winding starts at the point of intersection, continues around the coil and through the line 34, and ends where wire 28 intersects that same line 34 for the third time.

An electrical current is conducted through wire 28 as indicated by the + and − signs 31 and 32, respectively. (It should be appreciated that the direction of current flow may vary from embodiment to embodiment or during operation and so is not fixed.) Wire 28 has a cross sectional surface dimension 33 taken through a center point of the wire. The length of wire times the half the wire width 33 times 2 pi (e.g., $2\pi rh$, where r is a wire radius and h is the wire length) yields a surface area of the wire, so a longer wire length has a greater surface area. The wire surface area generally is proportional to the capacitance of the wire, so the greater the surface area, the greater the capacitance.

When viewed along line 34-34, the right side 35 of coil 27 includes more wire surface area than on left side 36. This is primarily due to the increased length of the wire in outer winding 37, as opposed to the smaller corresponding winding of the opposing side. That is, the length of wire 28 in each half of a winding increases as the radial distance from center 30 increases. Similarly, when viewed along line 38-38, lower half 39 of coil 27 contains more wire than upper half 41 and thus the surface area of wire 28 is greater. Such imbalance exists from each half of coil 27 no matter whether along lines 34-34 or 35-35 or along any other axis bisecting center point 29. This imbalance in wire length, and thus surface area, is inherent in the geometry of a spirally wound coil because of the increasing radius of a winding as it extends from the center point. Accordingly, many spiral-wound inductive coils may have one side with a greater capacitance than the other, which in turn may inject noise across the inductive coupling and into an electronic device. This noise, as previously mentioned, may deleteriously impact the operation and accuracy of various sensors, including capacitive sensors, in the electronic device and/or charging device.

Figure 7:
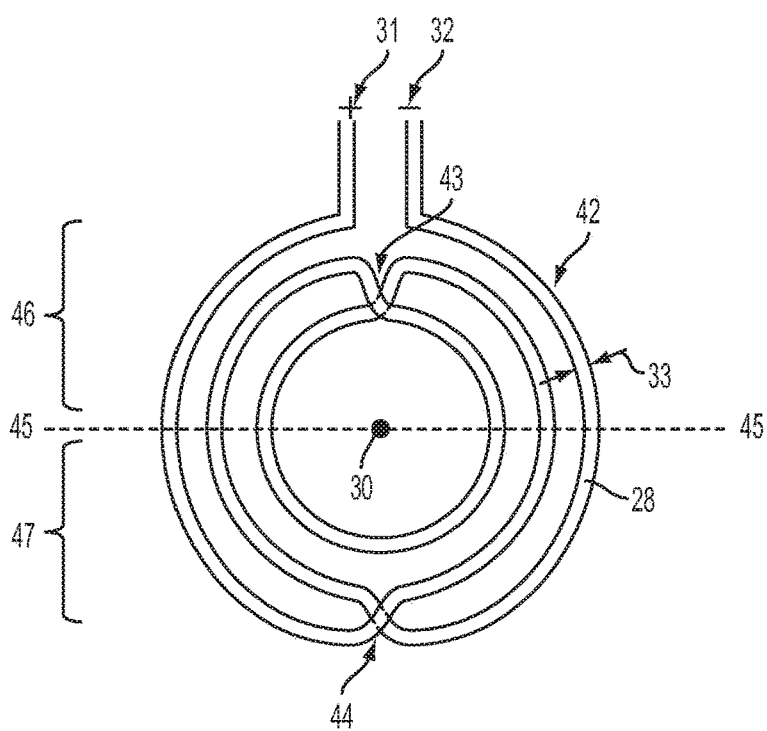
FIG. 7 is a top view of a capacitively balanced inductive coil according to one embodiment.

Referring to FIG. 7, one embodiment of a coil 42 is shown in which wire 28 is wound so as to substantially equalize the surface area of wire 28 included on each half of the coil 42. Again, it should be appreciated that the distance between windings of the coil is exaggerated to simplify viewing and comprehension of the figure. As with coil 27, coil 42 consists of a single length of wire wound in one or more windings to form the coil. In this embodiment, however, wire 28 may be wound such that each winding of the coil is substantially circular and presents substantially the same surface area on each side of a line bisecting the center 29 (when viewed from above, e.g., in the orientation of FIG. 7). This equalization of surface area is accomplished by winding wire 28 to pass over or under itself to form the other half of the winding. As shown at points 43 and 44 wire 28 passes over and under itself to form coil 42 with substantially circular and balanced windings.

In this embodiment, a line 45 drawn through center 30 of coil 42 results in the upper half 46 and lower half 47 of coil 42 containing approximately the same length of wire 28. Thus, the capacitance generated by each half of coil 42 is equalized and parasitic capacitance resulting from imbalance between the halves is substantially eliminated. While the embodiment shown in FIG. 7 includes wire 28 passing over itself at every winding turn (a "crossing"), for ease of manufacture and in other embodiments one or more conventional spiral windings may be interspersed with the circular windings described in this embodiment. Thus, in some embodiments, only every second, third, fourth, or so on winding may include a crossing. That is, conventional spiral wound windings (for example, as shown in FIG. 6) may be alternated or interspersed with the winding shown in FIG. 7 to provide a balanced or near-balanced capacitance.

These alternate embodiments may also reduce stray capacitance in a coil and thus reduce common mode noise. Referring to FIG. 5, the capacitance represented by capacitors 24a and 24b is substantially equalized in these embodiments thus reducing or eliminating unwanted common mode noise. These embodiments may result in improved manufacturability and a reduction in the size of the resultant coil. While coil 42 in FIG. 7 is shown substantially circular it may be any symmetric geometry such as a square provided the surface area of wire 28 on adjacent halves of a winding, when viewed from above, are approximately equal.

Figure 8:
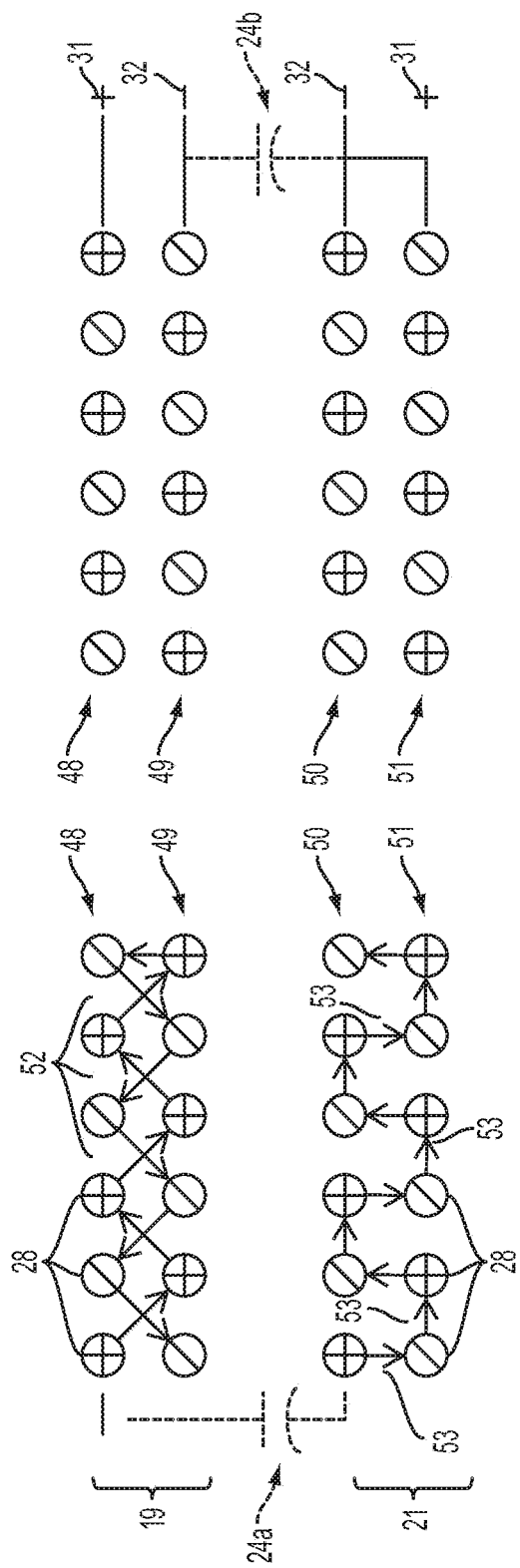
FIG. 8 is a side sectional view of inductive charging and receiving coils according to one embodiment.

Referring to FIG. 8, in another embodiment, a side view of a receiver coil 19 and transceiver coil 21 is shown, again with the distance between adjacent wires exaggerated. In conventional inductive coils, two layers of windings may be adjacent as shown in FIG. 8 and there may be parasitic capacitance generated between those windings. In the embodiment shown in FIG. 8, coil 19 includes two winding layers 48 and 49. Transceiver coil 21 also includes two winding layers 50 and 51. In multiple layer coils such as the embodiment shown in FIG. 8, parasitic capacitance may also be generated between layers of a single transmit or receive coil, or between layers of the two coils.

For example, in some cases there may be parasitic capacitances between coil layers 48 and 49 of the receive coil 19, between layers 50 and 51 of the transmit coil 21, between layer 48 of the receive coil and layer 51 of the transmit coil, between layer 48 of the receive coil and layer 50 of the transmit coil, between layer 49 of the transmit coil and layer 50 of the receive coil, and between layer 49 of the receive coil and layer 51 of the transmit coil. By way of comparison, the capacitance between nearer pairs of layers is lower than the capacitance between further pairs of layers. Thus, any given layer has a higher parasitic capacitance with a nearer coil than it does with a further coil, presuming all characteristics of the layers are equal. So, for example, a capacitance 24a between coil layer 48 and layer 50 is typically lower than a capacitance 24b between coil layer 49 and layer 50. This leads to an unbalanced capacitance between layers of the inductive transmit and receive coils and results in the generation of common mode noise which, as discussed above, may deleteriously affect certain functions of the portable electronic device. In the foregoing example, As discussed above, capacitance may be related to both the surface area of the conductor and the distance between conductors. In the embodiment described in FIG. 8, the single length of wire 28 forming coil 19 alternates in a serpentine fashion within adjacent winding layers 48 and 49. The same is true for the wire 28 forming winding layers 50 and 51 of transceiver coil 21. For ease of reference, adjacent windings are shown with + and / symbols while the order in which the windings are formed by a wire (e.g., the path of the wire) is shown by the series of arrows. That is, the arrows show the order in which windings are formed by the wire.

This alternating winding may substantially or fully balance the capacitance between winding layers 48 and 49 and between layers 50 and 51 to substantially reduce common mode noise between those layers and between all other combinations of layers in the transmit and receive coils. The same is true for embodiments having more or fewer layers and more or fewer windings.

While the continuous length of wire 28 is shown alternating between layers 48 and 49 in the direction of arrows 52, in another embodiment and as shown by arrows 53, wire 28 may form windings in a stair-step pattern alternating between layers, and then between adjacent windings. As a non-limiting example, the wire may alternate vertically from adjacent coil layer 50 to coil layer 51, then horizontally in layer 51 between adjacent windings, then back horizontally to layer 50. This pattern may also help in balancing capacitance between layers and/or coils.

As discussed with respect to FIG. 7, windings of continuous length of wire 28 alternate in each half winding such that the length of wire in each winding is approximately equal on each half of a winding. In another embodiment, the winding embodiment of FIG. 7 may be combined with the winding embodiments of FIG. 8 for coils containing multiple winding layers such as 48/49 and 50/51 shown in FIG. 8. In effect, by constructing a coil in accordance with combining the embodiments shown in FIGS. 7 and 8, stray capacitance is reduced or eliminated because capacitance within and between coils is balanced or near-balanced, thereby substantially eliminating parasitic capacitances 24a, 24b.

Figure 9:
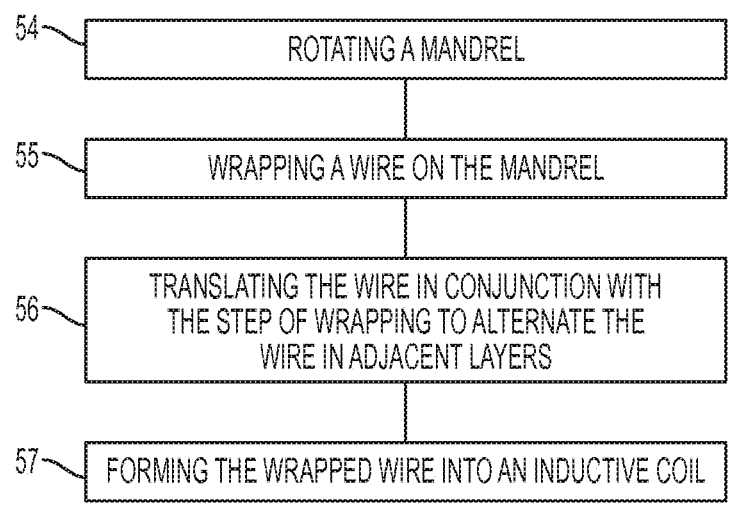
FIG. 9 is a flow chart illustrating a method of manufacturing an inductive coil according to one embodiment.

Referring to FIG. 9, a flow chart illustrating a method for manufacturing one embodiment of a coil 19 or 21 is shown. In step 54, a rotating mandrel is utilized. An electrically conductive wire length is wrapped on the mandrel in step 55. This wrapping may include wrapping the continuous wire length such that in each half winding the wire passes over itself to form substantially circular windings as described with respect to FIG. 7. In step 56 the wire is translated in conjunction with the step of wrapping to alternate the continuous wire length in alternate windings for a multiple winding layer coil. In this step 56, the embodiments described with respect to both FIGS. 7 and 8 may be achieved. That is the continuous length of wire 28 may be translated over or under itself within a winding as described with respect to FIG. 7 and/or the continuous length of wire 28 may be alternately interwoven in adjacent layers 48/49 or 50/51 as described with respect to FIG. 8. Alternately, either step 55 or step 56 can be eliminated to form a coil winding in accordance with either embodiment of FIG. 7 or FIG. 8. That is, if step 55 is eliminated, then a multiple winding layer coil may be produced but the continuous wire length is not alternated in each half winding as described with respect to FIG. 7. If step 56 is eliminated, then a single winding layer coil may be produced with the continuous wire length alternating in each half winding. In any of the above embodiments, in step 57 the wrapped wire is formed into an inductive coil structure to be incorporated into a portable electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. For example, while transceiver coil 21 and receiver coil 19 have been described as in a generally circular shape, it should be expressly understood that embodiments disclosed herein may be employed with coils of other geometric shapes. It will be apparent to one of ordinary skill in the art that many modifications and variations are possible in view of the above teachings.

What is claimed is:

1. An inductive coil, comprising:
a wire wound in at least a first planar layer and a second planar layer adjacent to the first planar layer, the inductive coil comprising:
a first half of the inductive coil; and
a second half of the inductive coil contiguous with the first half,
wherein the wire is wound such that a first plurality of windings of the wire form an inward spiral and a second plurality of windings of the wire form an outward spiral and wherein, within at least the first half of the inductive coil:
each consecutive winding in the first plurality of windings occupies a different one of a plurality of planar layers such that consecutive windings in the first plurality of windings are disposed diagonally from each other when perceived from a cross-sectional perspective;
each consecutive winding in the second plurality of windings occupies a different one of the plurality of planar layers such that consecutive windings in the second plurality of windings are disposed diagonally from each other when perceived from the cross-sectional perspective; and
within each of the plurality of planar layers, windings in the first plurality of windings alternate with windings in the second plurality of windings.

2. The inductive coil of claim 1, wherein each of the first plurality of windings and each of the second plurality of windings is approximately circular.

3. The inductive coil of claim 1, wherein the wire crosses itself at an edge of the first and second halves.

4. The inductive coil of claim 3, wherein each of the first plurality of windings and each of the second plurality of windings has a symmetric geometric shape.

5. A portable electronic comprising:
a housing;
an electronic componenet disposed within the housing;
an inductive coil disposed within the housing and coupled to the electronic component, the inductive coil comprising:
a wire wound in at least a first planar layer and a second planar layer adjacent to the first planar layer, the inductive coil comprising:
a first half of the inductive coil; and
a second half of the inductive coild contiguous with the first half,
wherein the wire is wound such that a first plurality of windings of the wire form an invward spiral and a second plurality of windings of the wire form an outward spiral and wherein, within at least the first half of the inductive coil:
each consecutive winding in the first plurality of windings occupies a different one of a plurality of planar layers such that consecutive windings in the first plurality of windings are disposed diagonally from each other when preceived from a cross-sectional perspective;
each consecutive winding in the second plurality of windings occupies a different one of the plurality of planar layers such that consecutive windings in the second plurality of windings are disposed diagonally from each other when perceived from the cross-sectional perspective; and within each of the plurality of planar layers, windings in the first plurality of windings alternate with windings in the second plurality of windings.

6. The portable electronic device of claim 5, wherein each of the first plurality of windings and each of the second plurality of windings is approximately circular.

7. The portable electronic device of claim 5, wherein the wire crosses itself at an edge of the first and second halves.

8. The portable electronic device of claim 7, wherein each of the first plurality of windings and each of the second plurality of windings has a symmetric geometric shape.

9. A wireless charging system, comprising:

an inductive transmit coil configured to transmit wireless power, the inductive transmit coil comprising:
  a first wire wound in a plurality of turns in at least a first planar layer and a second planar layer adjacent to the first planar layer, the inductive transmit coil comprising:
    a first half of the inductive transmit coil; and
    a second half of the inductive transmit coil contiguous with the first half,
  wherein two consecutive turns of the first wire in the first half of the inductive transmit coil alternate between the first planar layer and the second planar layer; and an inductive receive coil configured to receive the wireless power from the inductive transmit coil, the inductive receive coil comprising:
  a second wire wound in at least a third planar layer and a fourth planar layer adjacent to the third planar layer, the inductive receive coil comprising:
    a first half of the inductive receive coil; and
    a second half of the inductive receive coil contiguous with the first half,
  wherein the second wire is wound such that a first plurality of windings of the second wire form an inward spiral and a second plurality of windings of the second wire form an outward spiral and wherein, within at least the first half of the inductive receive coil:

each consecutive winding in the first plurality of windings occupies a different one of the third planar layer or the fourth planar layer such that consecutive windings in the first plurality of windings are disposed diagonally from each other when perceived from a cross-sectional perspective;

each consecutive winding in the second plurality of windings occupies a different one of the third planar layer or the fourth planar layer such that consecutive windings in the second plurality of windings are disposed diagonally from each other when perceived from the cross-sectional perspective; and within each of the third and fourth planar layers, windings in the first plurality of windings alternate with windings in the second plurality of windings.

10. The wireless charging system of claim 9, wherein the two consecutive turns of the first wire are disposed diagonally from each other when perceived from a cross-sectional perspective.

11. The wireless charging system of claim 9, wherein the two consecutive turns of the first wire are disposed directly vertically or horizontally from each other when perceived from a cross-sectional perspective.

12. The wireless charging system of claim 9, wherein each of the first plurality of windings of the second wire and each of the second plurality of windings of the second wire is approximately circular.

13. The wireless charging system of claim 9, wherein the first wire crosses itself at an edge of the first and second halves of the inductive transmit coil.

14. The wireless charging system of claim 13, wherein each of the plurality of turns of the first wire has a symmetric geometric shape.

15. The wireless charging system of claim 9, wherein the second wire crosses itself at an edge of the first and second halves of the inductive receive coil.

16. The wireless charging system of claim 15, wherein each of the plurality of windings of the second wire and each of the second plurality of windings of the second wire has a symmetric geometric shape.

\* \* \* \* \*